(12) United States Patent
Manolakos et al.

(10) Patent No.: US 11,740,320 B2
(45) Date of Patent: Aug. 29, 2023

(54) SIMPLIFIED CELL LOCATION INFORMATION SHARING FOR POSITIONING PURPOSES

(71) Applicant: QUALCOMM Incorporated, San Diego, CA (US)

(72) Inventors: Alexandros Manolakos, San Diego, CA (US); Sony Akkarakaran, Poway, CA (US); Joseph Binamira Soriaga, San Diego, CA (US); Tao Luo, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 16/560,745

(22) Filed: Sep. 4, 2019

(65) Prior Publication Data

US 2020/0110151 A1    Apr. 9, 2020

(30) Foreign Application Priority Data

Oct. 5, 2018  (GR) ............................... 20180100460

(51) Int. Cl.
*G01S 5/06* (2006.01)
*G01S 5/10* (2006.01)
(Continued)

(52) U.S. Cl.
CPC .............. *G01S 5/06* (2013.01); *G01S 5/0289* (2013.01); *G01S 5/10* (2013.01); *H04W 64/003* (2013.01)

(58) Field of Classification Search
CPC ........ G01S 5/0236; G01S 5/0289; G01S 5/06; G01S 5/10; H04W 64/003
See application file for complete search history.

(56) References Cited

U.S. PATENT DOCUMENTS 8,913,554 B2 * 12/2014 Aguirre ................. H04W 28/16
370/235
10,082,559 B1 * 9/2018 Saxon ................... G01S 5/0273
(Continued)

FOREIGN PATENT DOCUMENTS

EP    3165938 A1    5/2017
EP    3817468 A1    5/2021
(Continued)

OTHER PUBLICATIONS

International Search Report and Written Opinion—PCT/US2019/049787—ISA/EPO—dated Nov. 27, 2019.

*Primary Examiner* — Charles N Appiah
*Assistant Examiner* — Nicole M Louis-Fils
(74) *Attorney, Agent, or Firm* — MG-IP Law, P.C.

(57) ABSTRACT

Disclosed are techniques to determine a position of a user equipment (UE). In an aspect, the UE receives a plurality of positioning reference signals (PRS) from a plurality of cells. The UE determines a plurality of time of arrivals (TOA) of the plurality of PRSs, and prunes the plurality of TOAs based on the plurality of PRSs. The UE then derives a time difference of arrival (TDOA) vector from the pruned TOAs. The TDOA vector includes multiple TOA related measurements of multiple cells. The UE prunes the TOAs such that the cells represented in the TDOA vector are sufficiently geographically dispersed to determine the position of the UE at least in 2D.

27 Claims, 14 Drawing Sheets

(51) Int. Cl.
*H04W 64/00* (2009.01)
*G01S 5/02* (2010.01)

(56) References Cited

U.S. PATENT DOCUMENTS

| | | | |
|---|---|---|---|
| 2011/0081933 A1* | 4/2011 | Suh .................... | H04B 17/364 |
| | | | 455/509 |
| 2012/0040696 A1* | 2/2012 | Siomina ............... | H04L 5/0062 |
| | | | 455/456.6 |
| 2012/0165012 A1* | 6/2012 | Fischer ................ | G01S 5/10 |
| | | | 455/435.1 |
| 2015/0188678 A1* | 7/2015 | Wu ...................... | G01S 5/0027 |
| | | | 455/456.6 |
| 2015/0193496 A1 | 7/2015 | Crawford et al. | |
| 2017/0276761 A1 | 9/2017 | Park et al. | |
| 2017/0331577 A1* | 11/2017 | Parkvall ............... | H04W 8/18 |
| 2017/0366244 A1* | 12/2017 | Lee ..................... | H04B 7/0619 |
| 2017/0373745 A1* | 12/2017 | Park ..................... | H04B 7/0478 |
| 2018/0027421 A1* | 1/2018 | Chrabieh ............. | H04W 4/02 |
| | | | 455/446 |
| 2018/0123751 A1 | 5/2018 | Narasimha et al. | |
| 2021/0377897 A1 | 12/2021 | Bao et al. | |

FOREIGN PATENT DOCUMENTS

| | | |
|---|---|---|
| WO | 2016099546 A1 | 6/2016 |
| WO | 2020003896 A1 | 1/2020 |

* cited by examiner

SIMPLIFIED CELL LOCATION INFORMATION SHARING FOR POSITIONING PURPOSES

CROSS-REFERENCE TO RELATED APPLICATION

The present application for patent claims priority under 35 U.S.C. § 119 to Greek Patent Application No. 20180100460, entitled "SIMPLIFIED CELL LOCATION INFORMATION SHARING FOR POSITIONING PURPOSES," filed Oct. 5, 2018, assigned to the assignee hereof, and expressly incorporated herein by reference in its entirety.

TECHNICAL FIELD

Various aspects described herein generally relate to wireless communication systems, and more particularly, to simplified cell location information sharing for positioning purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a method of a user equipment (UE). The method comprises receiving a plurality of positioning reference signals (PRS) from a plurality of cells. The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, the PRS ID of each member cell indicates a membership of that member cell in that cell group. The method also comprises detecting a plurality of time of arrivals (TOA) of the plurality of PRSs. The method further comprises deriving a time difference of arrival (TDOA) vector from the plurality of TOAs, and sending the TDOA vector to a network entity. The TDOA vector includes multiple TOA related measurements of multiple cells.

An aspect is directed to a method of a network entity. The method comprises configuring a plurality of cells to transmit a plurality of positioning reference signals (PRS) to a user equipment (UE). The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The method also comprises receiving a time difference of arrival (TDOA) vector from the UE. The method further comprises determining a position of the UE based on the TDOA vector. The TDOA vector includes multiple TOA related measurements of multiple cells.

An aspect is directed to a user equipment (UE) comprising a memory, a transceiver, and a processor coupled to the memory and the transceiver. The processor, the memory, and the transceiver are configured to receive a plurality of positioning reference signals (PRS) from a plurality of cells. The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The processor, the memory, and the transceiver are also configured to detect a plurality of time of arrivals (TOA) of the plurality of PRSs. The processor, the memory, and the transceiver are further configured to derive a time difference of arrival (TDOA) vector from the plurality of TOAs. The processor, the memory, and the transceiver are yet further configured to send the TDOA vector to a network entity. The TDOA vector includes multiple TOA related measurements of multiple cells.

An aspect is directed to a network entity comprising a memory, a transceiver, and a processor coupled to the memory and the transceiver. The processor, the memory, and the transceiver are configured to configure a plurality of cells to transmit a plurality of positioning reference signals (PRS) to a user equipment (UE). The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The processor, the memory, and the transceiver are also configured to receive a time difference of arrival (TDOA) vector from the UE. The processor, the memory, and the transceiver are further configured to determine a position of the UE based on the TDOA vector. The TDOA vector includes multiple TOA related measurements of multiple cells.

An aspect is directed to a user equipment (UE). The UE comprises means for receiving a plurality of positioning reference signals (PRS) from a plurality of cells. The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The UE also comprises means for detecting a plurality of time of arrivals (TOA) of the plurality of PRSs. The UE further comprises means for deriving a time difference of arrival (TDOA) vector from the plurality of TOAs, and means for sending the TDOA vector to a network entity. The TDOA vector includes multiple TOA related measurements of multiple cells.

An aspect is directed to a network entity. The network entity comprises means for configuring a plurality of cells to transmit a plurality of positioning reference signals (PRS) to a user equipment (UE). The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The network entity also comprises means for receiving a time difference of arrival (TDOA) vector from the UE. The network entity further comprises means for determining a position of the UE based on the TDOA vector. The TDOA vector includes multiple TOA related measurements of multiple cells.

An aspect is directed to a non-transitory computer-readable medium containing instructions executable by a user equipment (UE) being stored thereon. The instructions cause the UE to receive a plurality of positioning reference signals (PRS) from a plurality of cells. The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The instructions also cause the UE to detect a plurality of time of arrivals (TOA) of the plurality of PRSs. The instructions further cause the UE to derive a time difference of arrival (TDOA) vector from the plurality of TOAs, and send the TDOA vector to a network entity. The TDOA vector includes multiple TOA related measurements of multiple cells.

An aspect is directed to a non-transitory computer-readable medium containing instructions executable by a network entity being stored thereon. The instructions cause the network entity to configure a plurality of cells to transmit a plurality of positioning reference signals (PRS) to a user equipment (UE). The plurality of cells is grouped into one or more cell groups. Each cell group comprises one or more member cells in which each member cell is one of the plurality of cells. Each cell group is associated with an attribute set comprising one or more attributes. For each cell group, all member cells have all attributes of the associated attribute set in common. The plurality of PRSs includes a plurality of PRS IDs. For each cell group, a PRS ID of each member cell indicates a membership of that member cell in that cell group. The instructions also cause the network entity to receive a time difference of arrival (TDOA) vector from the UE. The instructions further cause the network entity to determine a position of the UE based on the TDOA vector. The TDOA vector includes multiple TOA related measurements of multiple cells.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
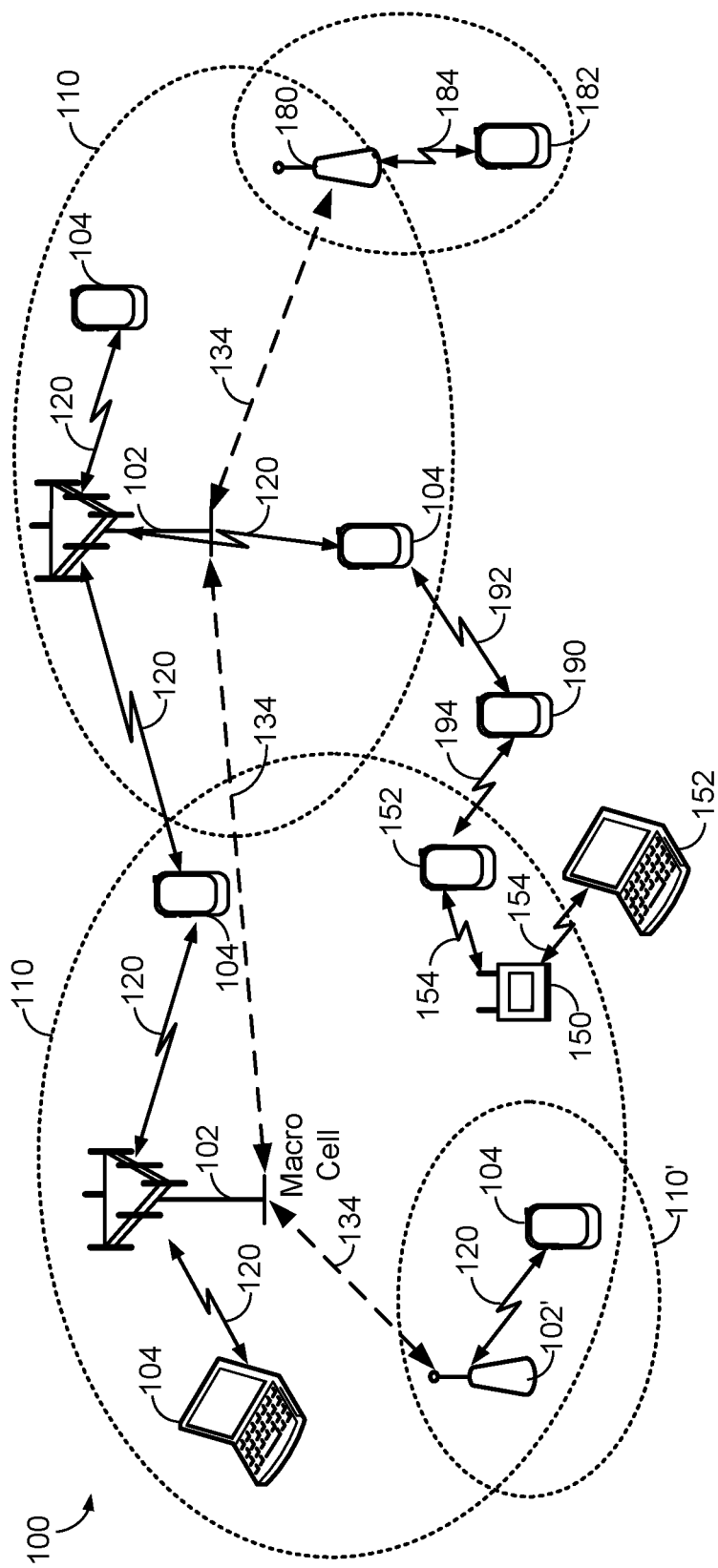
FIG. 1 illustrates an exemplary wireless communications system according to various aspects.

Various aspects described herein generally relate to wireless communication systems, and more particularly, to phase difference of arrival (PDoA) and angle of departure (AoD) estimation. In an aspect, a network entity may provide a base station almanac (BSA) to a UE. The BSA may indicate a set of transmission points associated with a base station, and the UE may perform measurements on the signal transmitted from the set of transmission points. In particular, the UE may determine the PDoAs of the signals. The UE may further determine or estimate AoDs of the signals based on the PDoAs and/or may provide the PDoAs to the network entity.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a,"

"an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
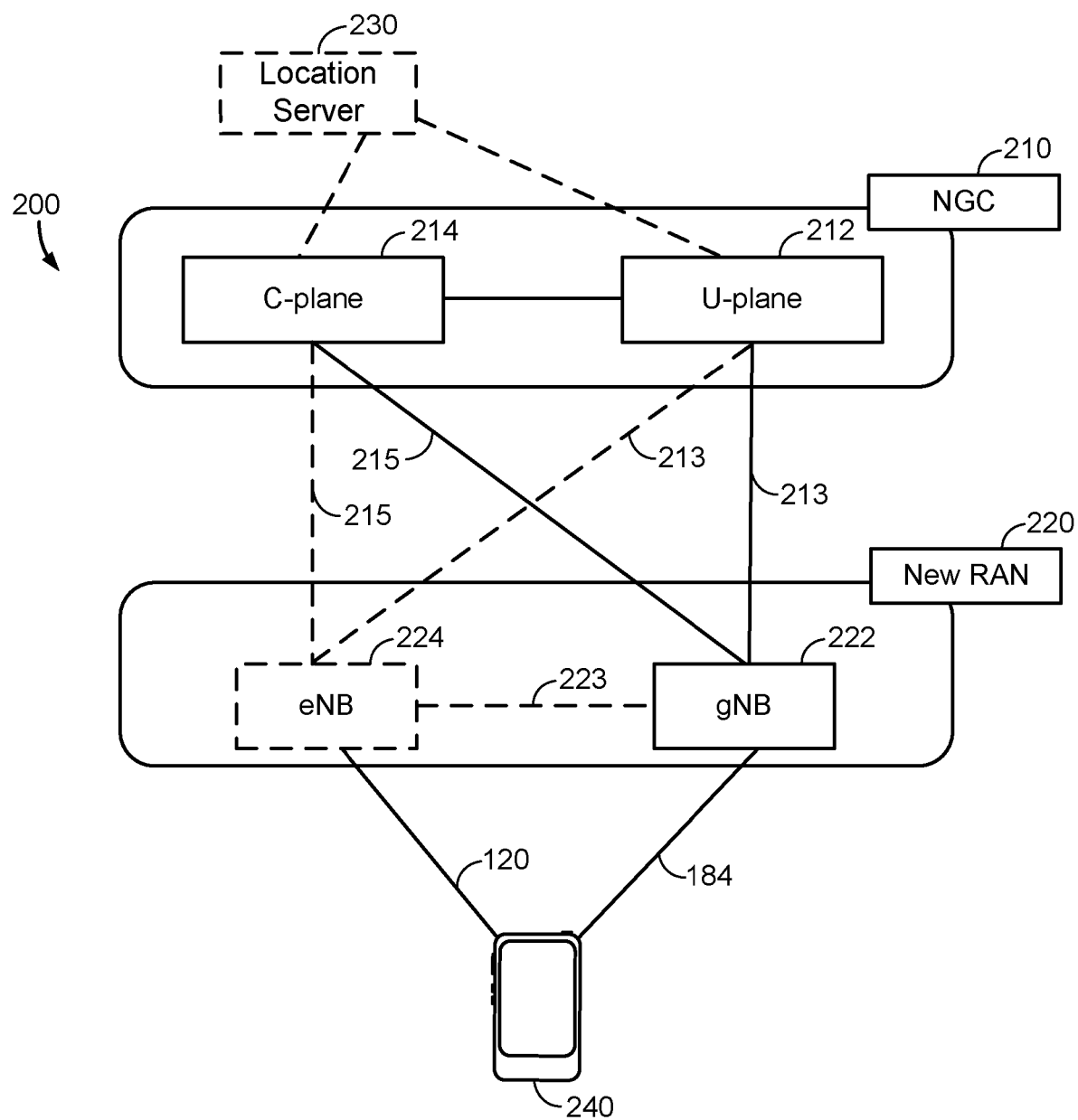
FIGS. 2A and 2B illustrate example wireless network structures according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
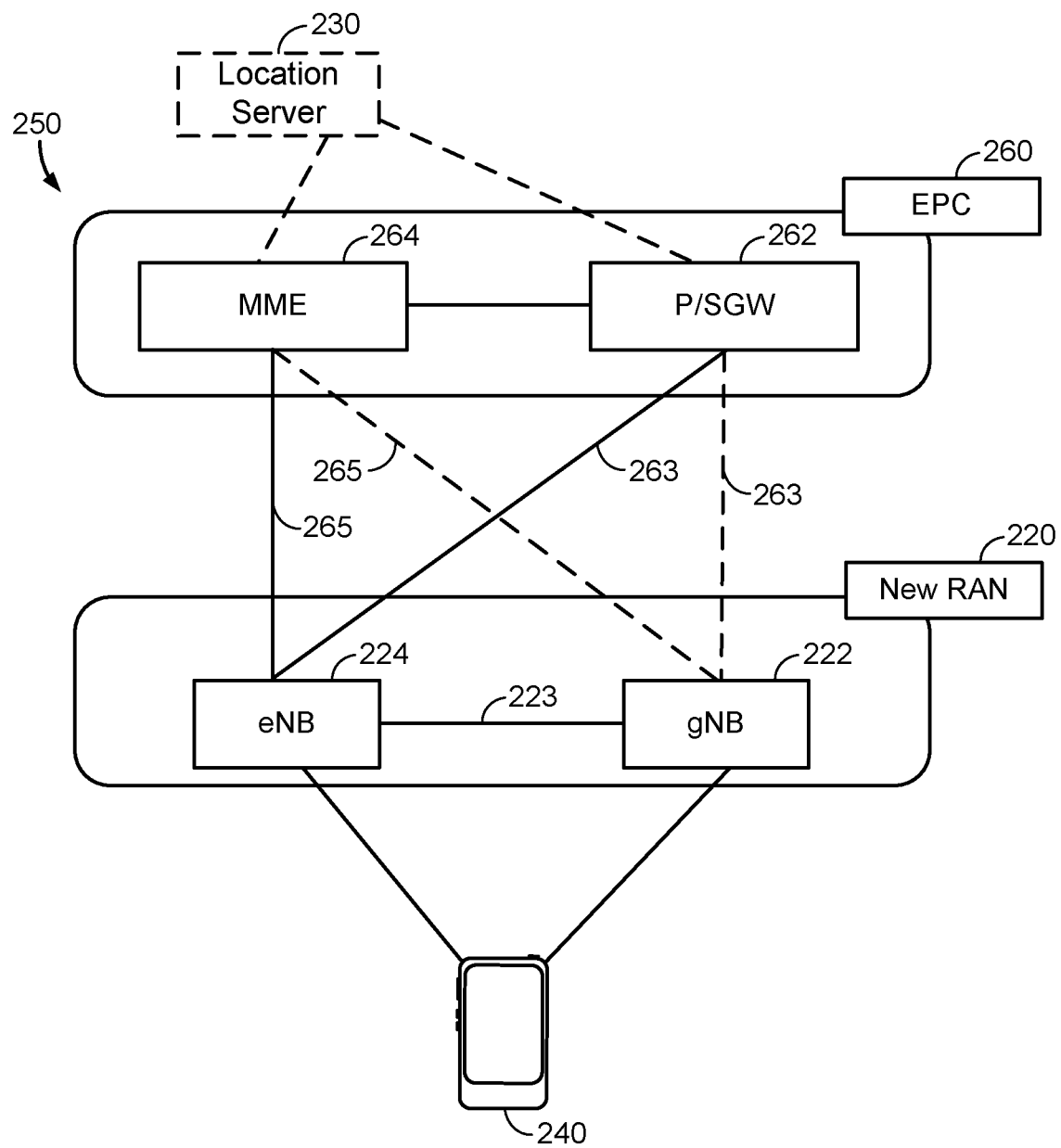

According to various aspects, FIG. 2B illustrates another example wireless network structure 250. For example, Evolved Packet Core (EPC) 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3A:
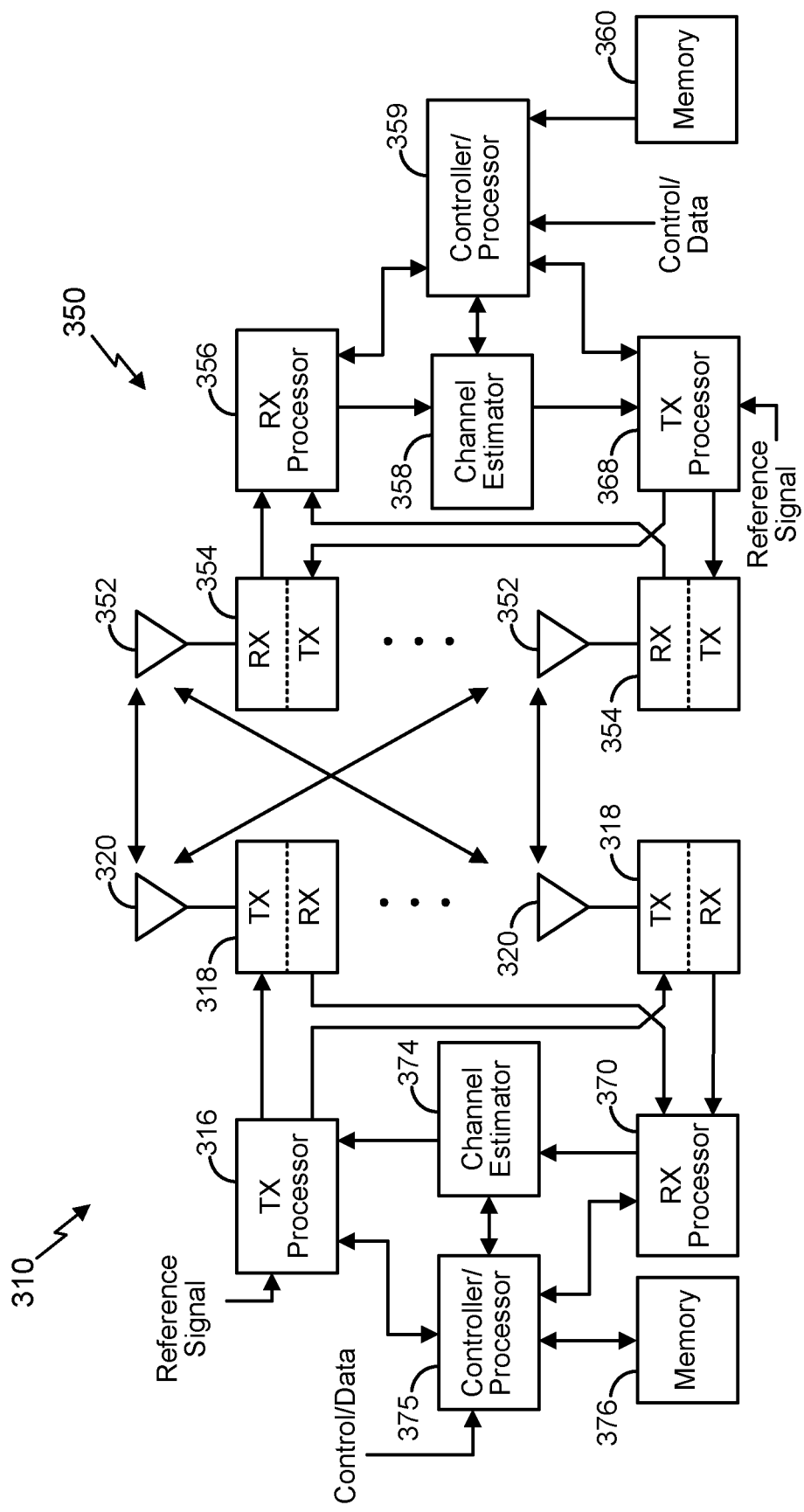
FIG. 3A illustrates an exemplary base station and an exemplary UE in an access network according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
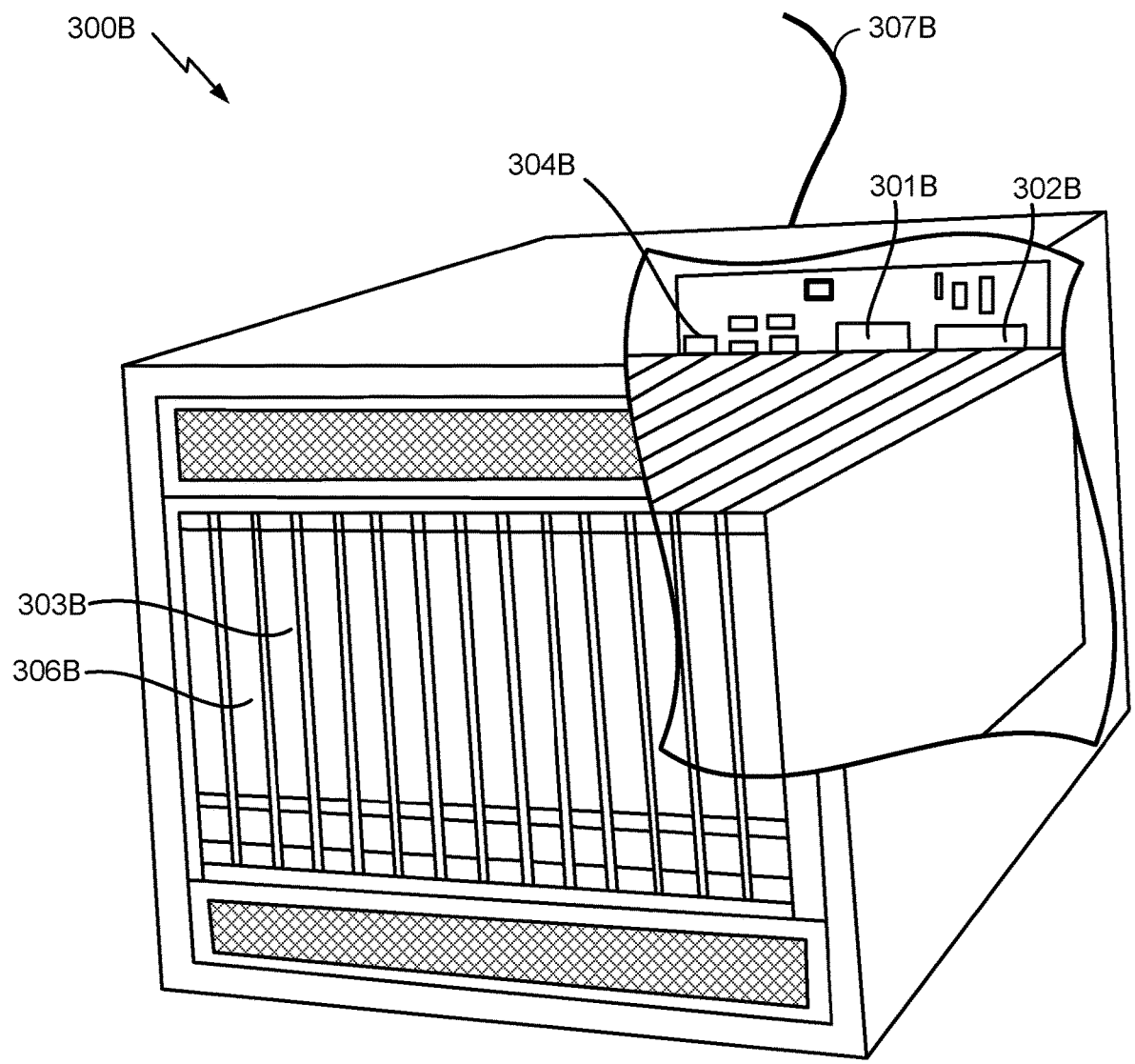
FIG. 3B illustrates an exemplary server according to various aspects.

FIG. 3B illustrates an exemplary server 300B. In an example, the server 300B may correspond to an example configuration of the location server 230 described above. The server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
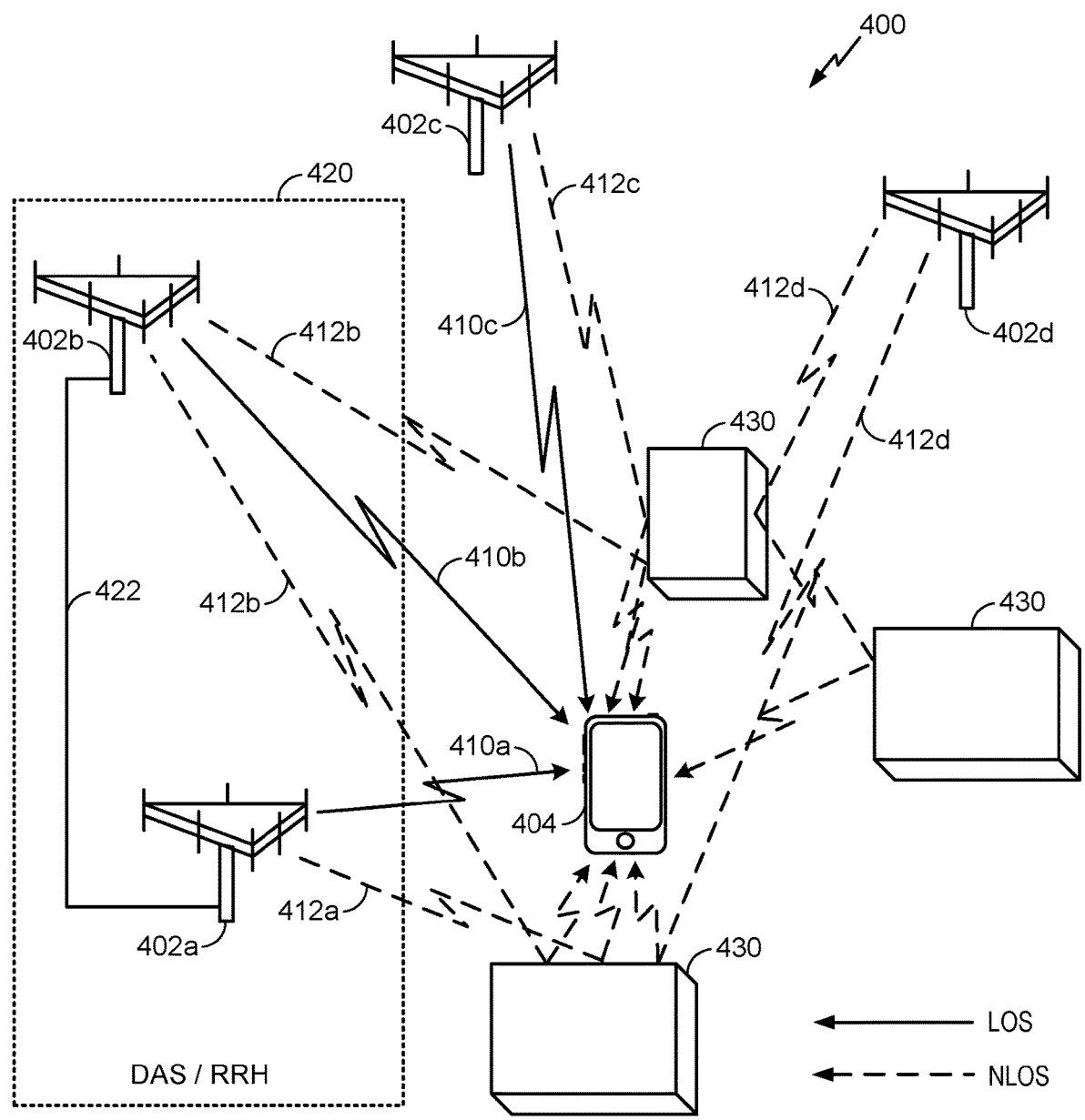
FIG. 4 illustrates an exemplary wireless communications system according to various aspects.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a-d* (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402*a* and 402*b* form a DAS/RRH 420. For example, the base station 402*a* may be the serving base station of the UE 404 and the base station 402*b* may be a neighbor base station of the UE 404. As such, the base station 402*b* may be the RRH of the base station 402*a*. The base stations 402*a* and 402*b* may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402*a* transmitting over an LOS path 410*a* and an NLOS path 412*a*, base station 402*b* transmitting over an LOS path 410*b* and two NLOS paths 412*b*, base station 402*c* transmitting over an LOS path 410*c* and an NLOS path 412*c*, and base station 402*d* transmitting over two NLOS paths 412*d*. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

Each LOS path 410 and NLOS path 412 represents the path followed by an RF signal. An "RF signal" comprises an electromagnetic wave that transports information through the space between the transmitter and the receiver. As illustrated in FIG. 4 and as described further below, the receiver (e.g., UE 404) may receive multiple "RF signals" corresponding to each transmitted RF signal due to the propagation characteristics of RF signals through multipath channels. More specifically, when a transmitter (e.g., a base station 402) transmits an RF signal, the RF signal received at the receiver (e.g., UE 404) is the sum or accumulation of the RF signals received over multiple paths. For example, the UE 404 may combine the RF signals received over the LOS path 410c and the NLOS path 412c into a single RF signal. Since signal paths may have different lengths and arrive at the receiver from different directions, as illustrated in FIG. 4, the RF signal from each path is accordingly delayed and arrives at a certain angle. This directional effect is more pronounced at higher frequencies, such as mmW.

In receive beamforming, the receiver uses a receive beam to amplify RF signals detected on a given channel. For example, the receiver can increase the gain setting and/or adjust the phase setting of an array of antennas (e.g., antennas 352 in FIG. 3) in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., RSRP, SINR, etc.) of the RF signals received from that direction.

Figure 5:
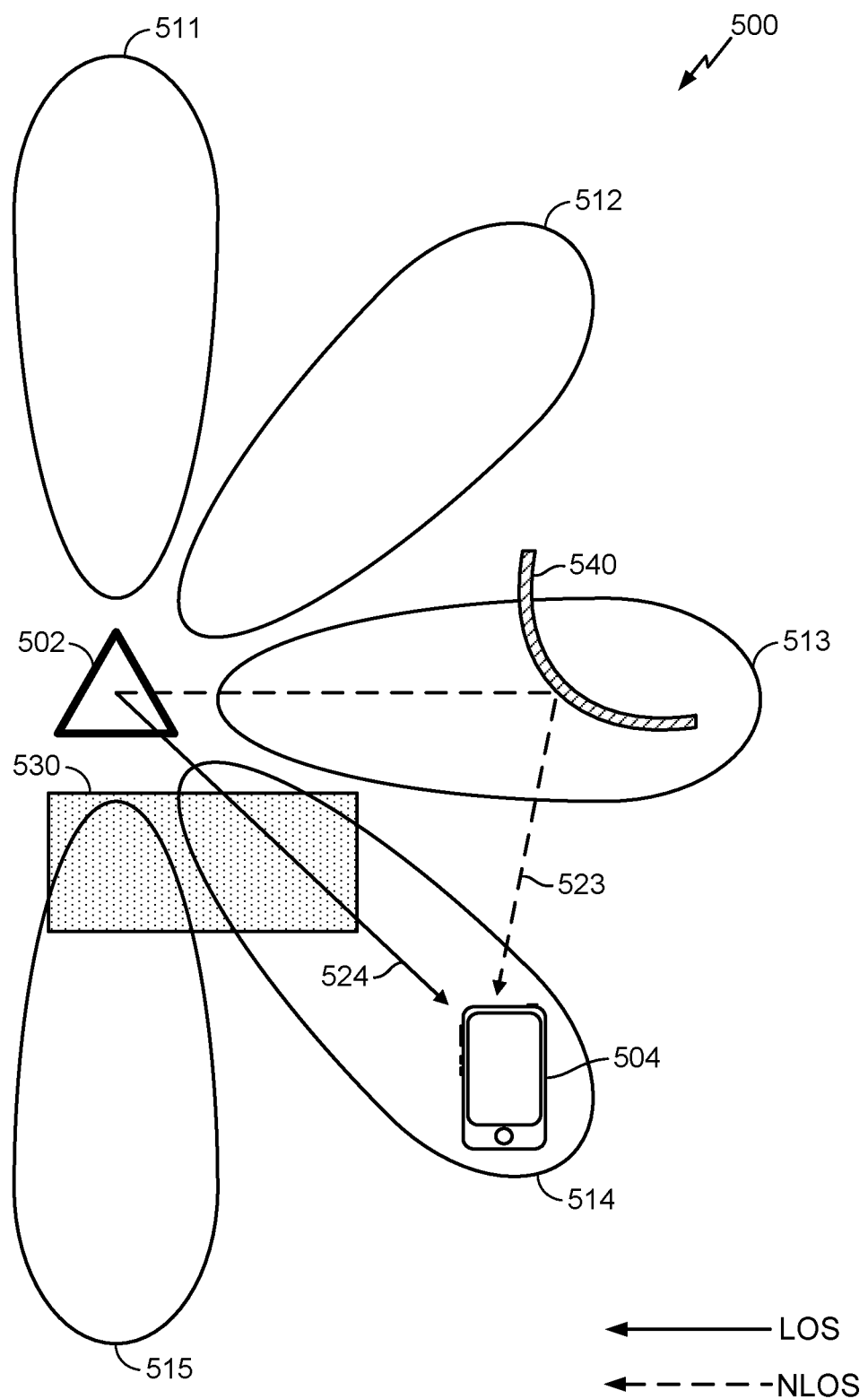
FIG. 5 illustrates an exemplary wireless communications system according to various aspects.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS stream 523 of RF signals transmitted on beam 513 and an LOS stream 524 of RF signals transmitted on beam 514. Although FIG. 5 illustrates the NLOS stream 523 and the LOS stream 524 as single lines (dashed and solid, respectively), as will be appreciated, the NLOS stream 523 and the LOS stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS stream 524 is weaker than the NLOS stream 523, the LOS stream 524 will arrive at the UE 504 before the NLOS stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS stream 523. The beam of interest for position estimation, however, would be the beam 514, as it carries the strongest LOS stream 524, despite being obstructed.

Figure 6A:
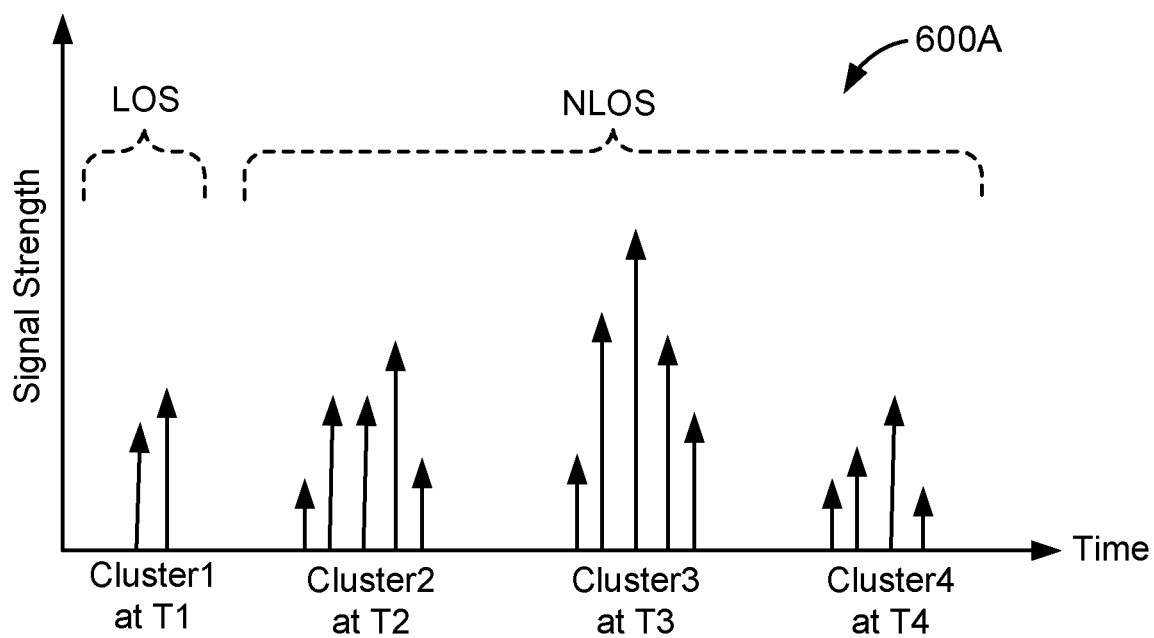
FIG. 6A is a graph showing the RF channel response at a UE over time according to various aspects.
Figure 6B:
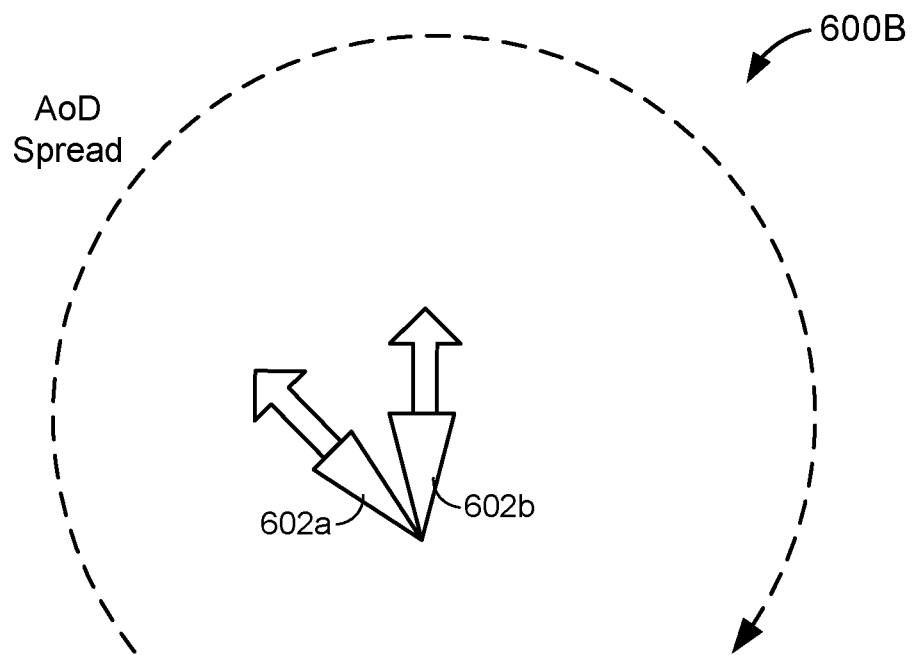
FIG. 6B illustrates an exemplary separation of clusters in angle of departure (AoD) according to various aspects.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS stream (i.e., the stream arriving over the LOS or the shortest path), and may correspond to the LOS stream 524. The third cluster at time T3 is comprised of the strongest RF signals, and may correspond to the NLOS stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

Figure 7:
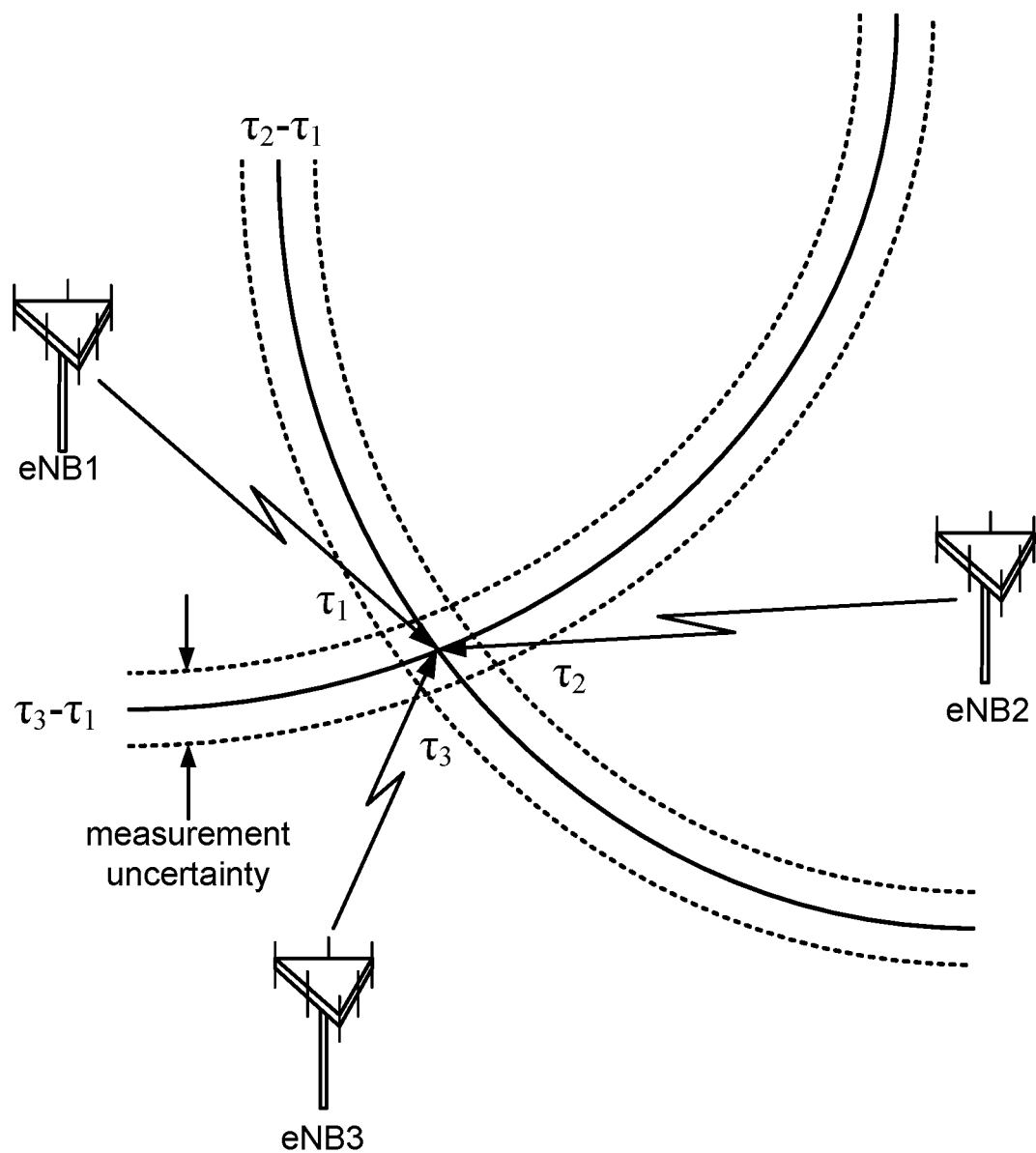
FIG. 7 illustrates an example scenario for observed time difference of arrival (OTDOA) based position estimating technique according to various aspects.

FIG. 7 illustrates an example scenario for OTDOA based position estimating technique. OTDOA is a multilateration methodology in which a UE measures the time of arrival (TOA) of downlink reference signals (DL RS) received from multiple cells (base stations, eNBs, gNBs, etc.). The TOAs from several neighboring cells are subtracted from a TOA of a reference cell ($eNB_1$ in FIG. 7) to form OTDOAs. Geometrically, each time (or range) difference determines a hyperbola, and the point at which these hyperbolas intersect is the estimated UE location.

To estimate a two-dimensional (2D) (x, y or latitude, longitude) location of the UE, a minimum of three timing measurements from geographically dispersed cells are necessary. In FIG. 7, the UE measures three TOA's $\tau_1$, $\tau_2$, and $\tau_3$ corresponding to the positioning reference signals (PRSs) transmitted from cells $eNB_1$, $eNB_2$, and $eNB_3$. Assuming that $eNB_1$ is the reference cell, then the two OTDOAs $t_{2,1}=\tau_2-\tau_1$ and $t_{3,1}=\tau_3-\tau_1$ are formed by the UE. Each TOA measurements $\tau_i$ can have some amount of error/uncertainty, and the hyperbolas include some width illustrating the measurement uncertainty. The estimated UE location is the intersection area of the hyperbolas.

The UE determines received signal time differences (RSTDs). RSTD is the time difference between PRSs from a cell i and from the reference cell measured at the UE. RSTD calculation is shown in equation 1.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i\_T_1) + (n_i\_n_1) \quad (1)$$

In equation 1, $(T_i-T_1)$ is the transmit time offset between cell i and the reference cell (also referred to as Real Time Differences (RTDs)), $n_i$ and $n_1$ are measurement errors, and c is the speed of light.

Transmit beamforming (TX BF) at the cell and/or receive beamforming at the UE can enable increased precision at the cell edge. Also, beam refinements can also leverage channel reciprocity procedures in new radio (NR). Uplink time difference of arrival (UTDOA) technique is similar to OTDOA technique except that the measurements are based on uplink reference signals from the UE.

Figure 8:
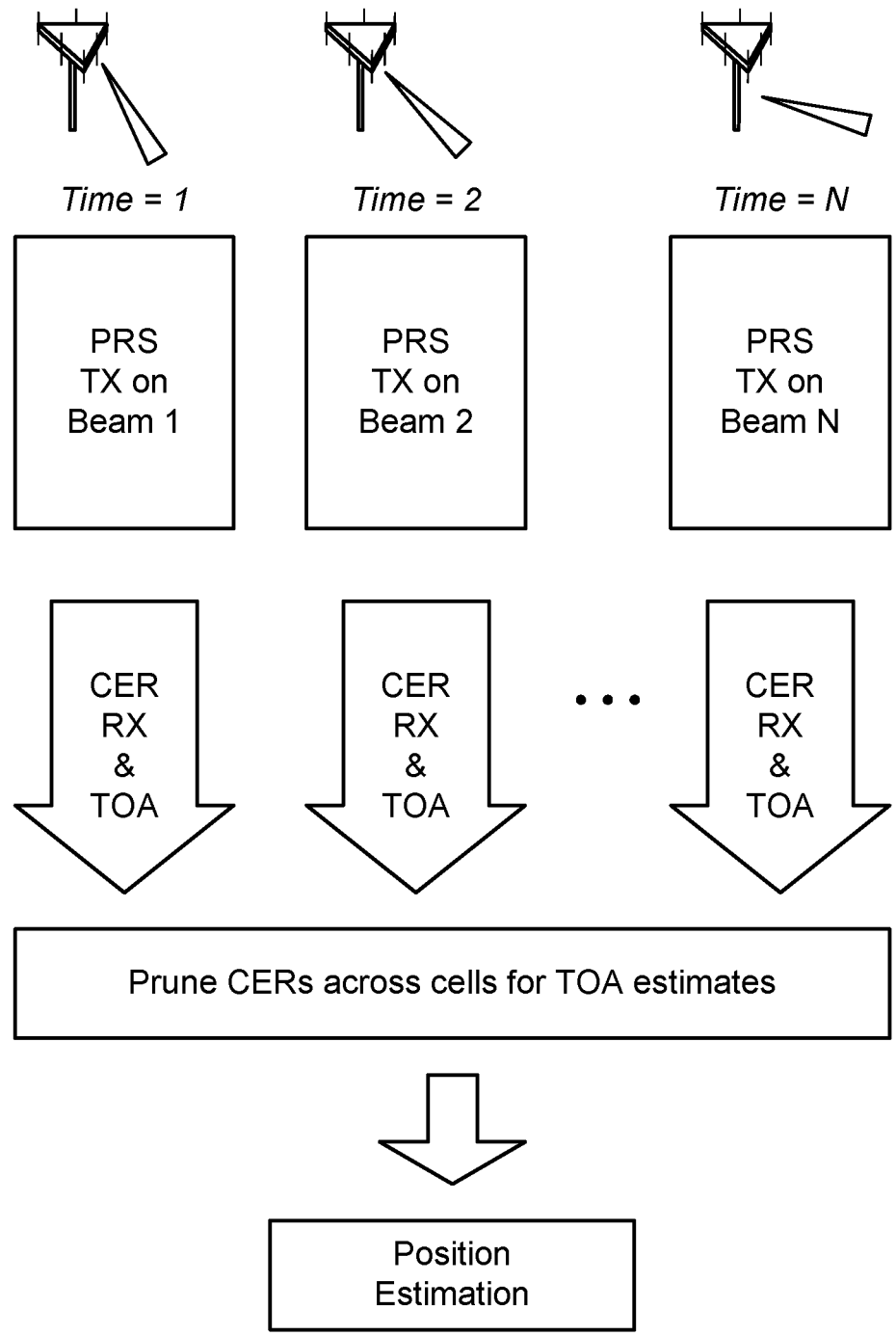
FIG. 8 an example scenario for utilizing beam sweeping for positioning estimation according to various aspects.

FIG. 8 illustrates an example scenario for utilizing beam sweeping for positioning estimation. In particular, Tx beam sweeping for positioning reference signals (PRSs), e.g., Tx beam sweeping at gNB, is illustrated. In this instance, it is assumed that the network is configured with beamformed PRSs. Multiple instances of PRSs allow for sweeping across all angle of departures (AoDs) for a cell at full transmit power (TxPwr) per beam. FIG. 8 illustrates a cell transmitting PRS on beam 1 at time 1, transmitting the PRS on beam 2 at time 2, and so on. Each of one or more cells of the network may transmit its own PRSs at different times on different beams.

The UE monitors all cells configured to the send PRSs across all instances. In particular, the UE determines channel energy responses (CERs) based on the received PRSs. The CERs are then pruned across all cells based on some quality metrics. The CERs are used to estimate the TOAs by finding the earliest peak of the PRSs. The UE may need several instances to see sufficient number of cells for estimating the position of the UE. The TOA estimates can be used to estimate the UE position. UE-based estimation is when the UE itself can estimate the position. The UE-based estimation is possible if a base station almanac (BSA) is provided to the UE. UE-assisted estimation is when the UE reports the TOA related measurements (e.g., OTDOA, RSTDs, etc.) to the network, e.g., to the location server, and the network estimations the UE's position.

In estimating the TOA from the CER, a first arrival path, i.e., the LOS path, is determined using noise-related quality thresholding for spurious local peaks. A TOA estimate is chosen such that it is the earliest local maximum of the CER such that 1) it is at least some threshold X dB higher than the median of the CER, and 2) it is at most some threshold Y dB lower than the main peak.

Figure 9:
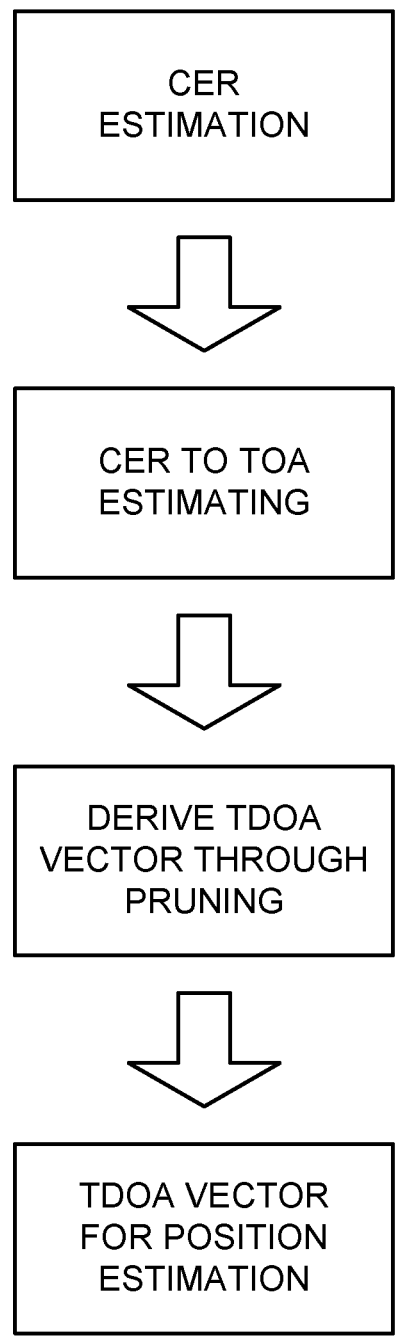
FIG. 9 illustrates an example flow for position estimation according to various aspects.

FIG. 9 illustrates an example flow for position estimation. In an aspect, the memory 360 of the UE 350 in FIG. 3A may be an example of a computer-readable medium that stores computer executable instructions to perform the flow of FIG. 9. In another aspect, means to perform the flow of FIG. 9 may comprise one or more of the TX processor 368, the controller/processor 358, the memory 360, the channel estimator 358, the RX processor 356, the transceiver 354 of the UE 350.

As seen in FIG. 9, the UE estimates the CERs from the PRSs transmitted from the cells. The TOAs are then estimated through determining the earliest local maximum CERs. The gathered estimated TOAs are then pruned to derive the TDOA vector, which is then used to estimate the position (for UE-based) or is reported back to the network (for UE-assisted).

Note that even at relatively high SINRs, there are occasions in which the TOA is wrongly estimated. One way to improve positioning accuracy is to select TOAs estimated from PRSs transmitted from geographically dispersed cells. In an aspect, TOA sorting and pruning techniques can be used to improve positioning accuracy by selecting the TOAs from the geographically dispersed cells.

Figure 10:
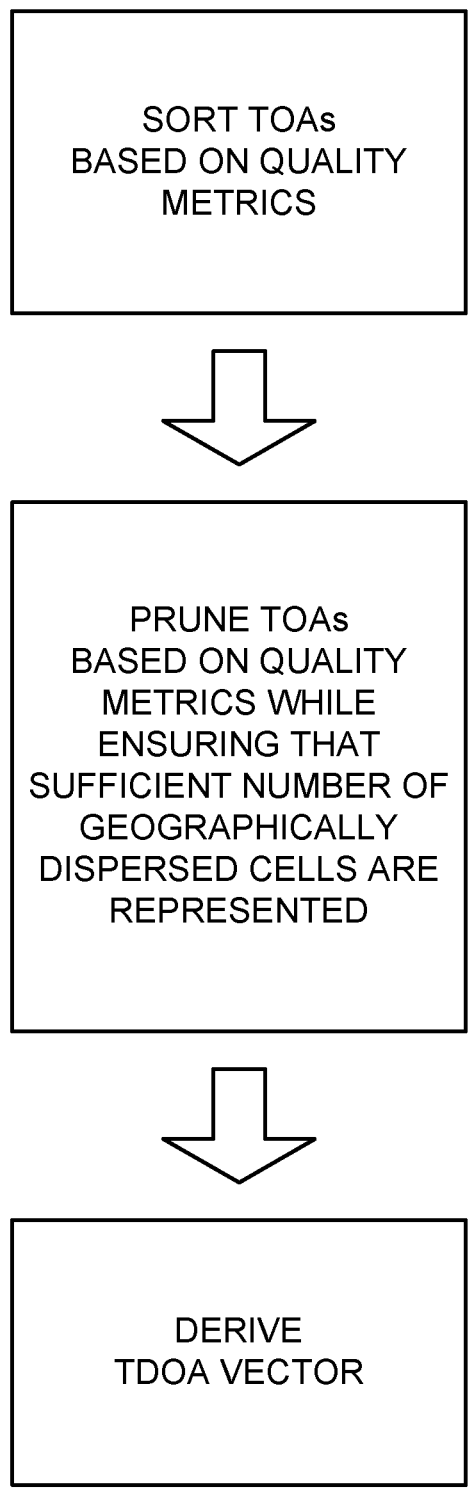
FIG. 10 illustrates an example flow for selecting TOAs to improve positioning accuracy according to various aspects.

FIG. 10 illustrates an example flow for selecting the TOAs to improve positioning accuracy. In an aspect, the memory 360 of the UE 350 in FIG. 3A may be an example of a computer-readable medium that stores computer executable instructions to perform the flow of FIG. 10. In another aspect, means to perform the flow of FIG. 10 may comprise one or more of the TX processor 368, the controller/ processor 358, the memory 360, the channel estimator 358, the RX processor 356, the transceiver 354 of the UE 350.

As seen in FIG. 10, the UE can sort the TOAs based on one or more quality metrics of the corresponding CERs. SINR (including SNR) is one example of a quality metric. Another example is the median/TOA-peak ratio. Yet another is the median/main peak ratio. The UE may then prune the TOAs based on the quality metrics while at the same time, ensuring that a sufficient number of geographically cells are represented in the TDOA vector. In other words, the quality of the received PRS is not the sole criteria in selecting the TOAs for pruning. Rather, locations of the cells are also taken into account when choosing the TOAs.

Figure 11:
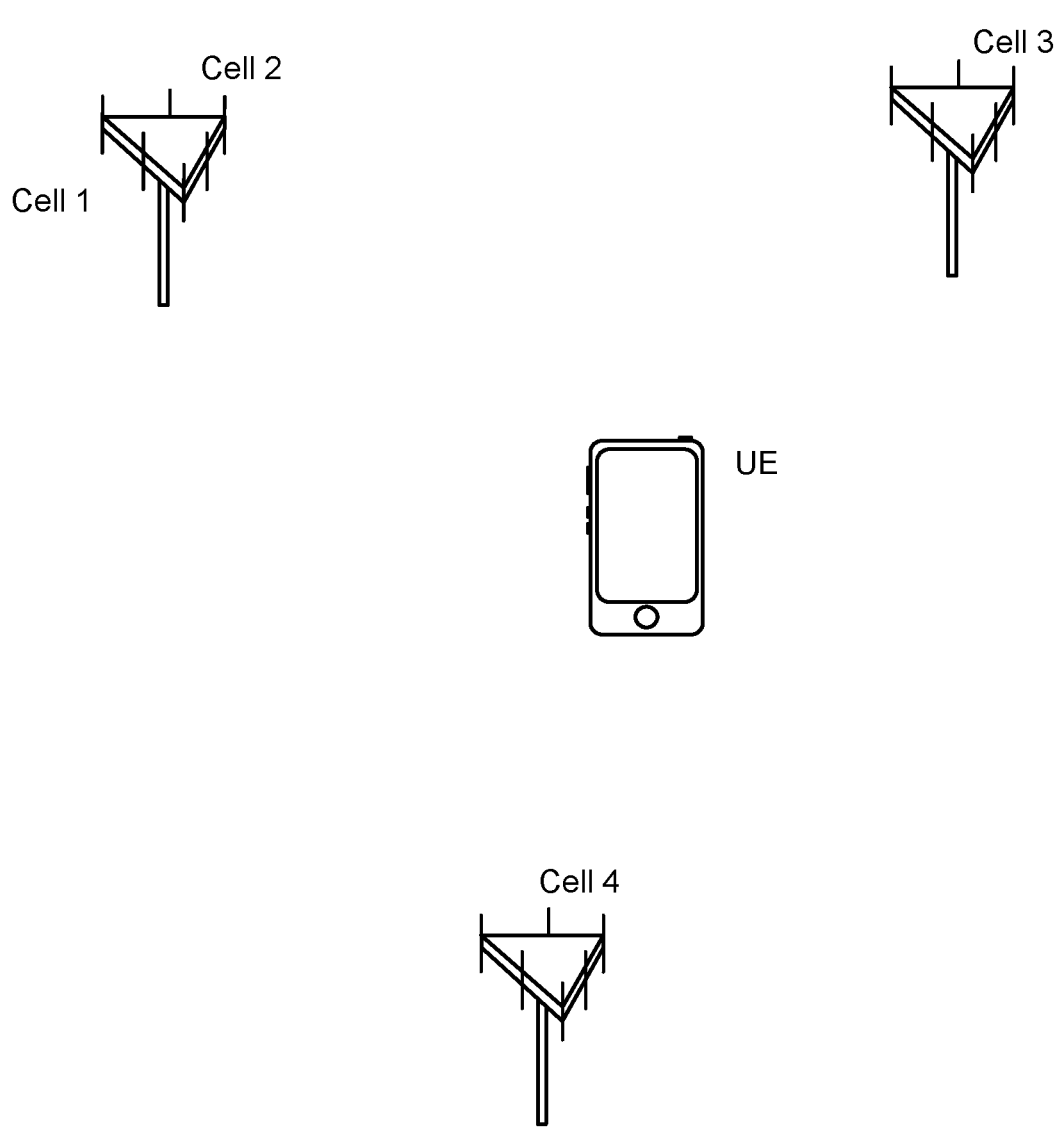
FIG. 11 illustrates a scenario for pruning the TOAs according to various aspects.

FIG. 11 illustrates a scenario for pruning the TOAs according to one or more aspects. In FIG. 11, assume that cells 1 and 2 are co-sited, i.e., at the same site. Also assume that based on measurements, the UE has determined that the qualities of the PRSs are in order from best to worst are from cell 1, cell 2, cell 3, and cell 4. Recall that to estimate a 2D position of the UE, at least three TOA measurements are necessary. If the TOAs are chosen purely based on the quality metrics, then the three TOAs selected would be the TOAs of cells 1, 2, and 3. However, the TOAs of cells 1, 2, and 3 would be insufficient since cells 1 and 2 are co-sited meaning that the TOAs of cells 1 and 2 are effectively the same. In this instance, the TOA of cell 2 (or cell 1) may be pruned and the TOA of cell 4 may be included assuming that the TOA of cell 4 meets the quality metric requirements.

Of course, it is possible that more than the minimum number of TOAs selected. For example, the TOAs of both cells 1 and 2 may be included as long as the TOAs of cells 3 and 4 are also included in the TDOA vector. That is, in an aspect, the TOAs may be pruned so as to ensure that sufficient number of geographically dispersed cells is represented in the pruned TOAs (e.g., at least three non-co-sited cells for 2D positioning, at least four non-co-sited cells for 3D positioning). As will be made clear further below, whether co-sited attribute is but one of several attributes that may be considered in pruning the TOAs.

Referring back to FIG. 10, from the pruned TOAs, the UE may derive a time difference of arrival (TDOA) vector. For example, the TOA with the highest quality metric may be identified as the reference TOA, and the RSTDs of other cells in the TDOA vector may be calculated in relation to the reference TOA (e.g., see equation (1)).

The UE may be equipped to prune the TOAs as described above when the network informs the UE with location attributes of the cells. In an aspect, these location attributes or simply "attributes" are relative attributes, i.e., relative to one another. That is, the signaled attributes may not include any absolute location information of the cells such as the x, y, z coordinates of the cells. Of course, the actual x, y, z coordinates are known to the location server.

The following are some (not necessarily all) of the attributes of the cells that the UE may be informed of—a co-site attribute, a line attribute, an area boundary attribute, a height attribute, a height boundary attribute, and a plane attribute. When a group of cells (e.g., two or more cells) have the same co-site attribute, the member cells of the group are co-sited. When a group of cells (e.g., three or more cells) have the same line attribute, the member cells are on a same line. For example, the member cells may be on a line parallel to a train track. When a group of cells (e.g., two or more cells) have the same area boundary attribute, the member cells are all located within a threshold area boundary (e.g., within a threshold distance of each other). When a group of cells (e.g., two or more cells) have the same height attribute, the member cells are all at a same height. When a group of cells (e.g., two or more cells) have the same height boundary attribute, the member cells are all within a threshold height boundary (e.g., within a threshold height of each other). When a group of cells (e.g., two or more cells) have the same plane attribute, the member cells are all on a same 2D plane.

The signaling of the attributes from the network can be semi-static, and can be sent to the UE along with the PRS configuration. In one aspect, the signaling can take the form of collections of PRS IDs in which a common attribute (co-site, line, area boundary, height, height boundary, plane) is identified with a particular PRS ID. The signaling can be provided to the UE after the UE makes a request, after the network is configured, or when the network configures a maximum size of the TOAs to be reported. Note that information related to height (e.g., the height attribute, the height boundary attribute, the plane attribute) can be signaled if the network requires 3D positioning.

The network, e.g., through a network entity such as the location server, may signal to the UE attributes of a plurality of cells. In an aspect, the plurality of cells may be grouped into one or more cell groups, and each cell group may comprise one or more member cells. Each cell group may be associated with one an attribute set comprising one or more attributes such that all member cells of the cell group have all attributes of the associated attribute set in common.

In one aspect, the PRS ID may include a scrambling ID, and the attribute information may be embedded in the scrambling IDs of the PRSs. The UE may use the scrambling ID of each PRS to identify the cell group to which the corresponding cell belongs. For example, for a scrambling ID of 16 bits, the last two bits (e.g., bits 1 and 0) may be used for the co-site attribute. In this example, the scrambling IDs of two PRSs have the same last two bits, then it may be assumed that the two corresponding cells can are co-sited. Conversely, if the last two bits are different, then it may be assumed that the two cells are not co-sited, i.e., located at different sites. In this example, the last two bits are mapped to a co-site attribute type. As another example, bits 4-2 may be used for the height attributes. Two cells with same values in bits 4-2 may be assumed to be at the same height. Conversely, two cells with different values in bits 4-2 may be assumed to be at different heights. In this example, the bits 4-2 are mapped to a height attribute type.

Generally, if a specified set of bits of the scrambling ID is the same for two or more cells, then the same two or more cells belong to, i.e., are member cells of, a cell group with a configured attribute. It may be said that the bits of each scrambling ID may be divided into one or more attribute bit ranges. Each attribute bit range may comprise one or more bits, and may be mapped to an attribute type (e.g., co-site attribute type, line attribute type, area boundary attribute type, height attribute type, height boundary attribute type, plane attribute type, and so on). For each cell of the plurality of cells, each attribute of the cell may be encoded in the attribute bit range of the scrambling ID mapped to the attribute type of the attribute.

In another aspect, the attribute information may be embedded into the RRC configuration. The PRSs may be configured with resource IDs. Also, different resource IDs may be associated with different attributes of the cells transmitting the PRSs. For example, the UE may determine that every three resource IDs are co-sited. That is, cells transmitting PRSs with resource IDs 0-2 are member cells of a cell group co-sited in one location, cells with resource IDs 3-5 are member cells of a cell group co-sited in another location, and so on. Note that the actual x, y, z coordinates of the locations need not be provided to the UE.

As another example, the UE may determine that cells with resource IDs 10-15 are member cells of a cell group at one height, cells with resource IDs 16-20 are member cells of a cell group at another height, and so on. Again, the actual heights of the cells need not be known to the UE. However, the network entity may inform the UE that heights of member cells among different cell height groups differ from each other by at least a minimum group height different.

Generally, the plurality of PRSs may include a plurality of resource IDs. The plurality of resource IDs may be grouped into one or more resource ID groups, and each resource ID group may correspond to a cell group. In other words, each resource ID group may correspond to an attribute set of one or more attributes as described above.

In an aspect, the UE may be configured with a default resource ID grouping to associate different group of resource IDs with different attribute sets. Alternatively or in addition thereto, the resource ID group information may be received from a network entity, such as the location server. For example, when the UE receives the resource ID group information from the network, the UE may overwrite any previous resource ID group information.

Figure 12:
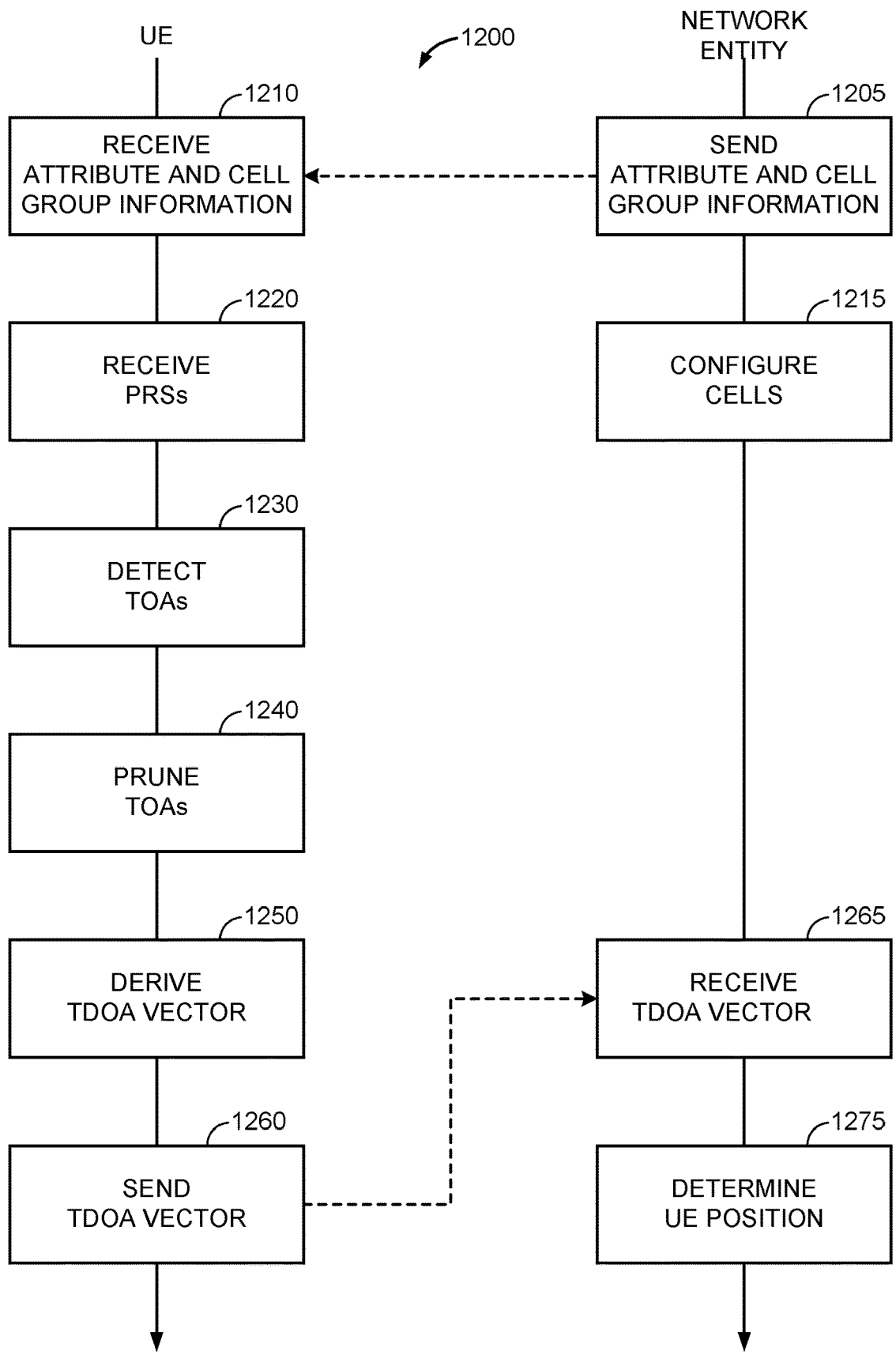
FIG. 12 illustrates a flow chart of an exemplary method of a UE-assisted positioning determination according to various aspects.

FIG. 12 illustrates a flow chart of an exemplary method 1200 according to an aspect of the disclosure for determining the position of a UE. The method 1200 is an example of a UE-assisted technique, and involves the UE and a network entity (e.g., a location server). At 1205, the network entity sends attribute and cell group information of a plurality of cells configured to transmit a corresponding plurality of PRSs. For example, the information may be sent to the UE along with PRS configuration. As mentioned above, the information may be sent as a result of request from the UE, after a network configuration, or when the network configures a maximum size of the TOAs reported back to the network from the UE. In an aspect, means to perform block 1205 may include one or more of the controller/processor 375, the memory 376, the TX processor 316, the transceiver 318, and/or the antenna 320 of the base station 310 illustrated in FIG. 3A, e.g., when the base station 310 serves as the location server. In another aspect, means to perform block 1205 may include one or more of the processor 301B, the volatile memory 302B, the non-volatile memory 303B, the drive 306b, and/or the network access ports 304B of the server 300B illustrated in FIG. 3B.

The attribute and cell group information provides at least the following. The plurality cells are grouped into one or more cell groups. Each cell group comprises one or more member cells, in which each member cell is one of the plurality of cells. Each cell group is associated with an attribute set comprising one or more attributes (e.g., one or more of co-site, line, area boundary, height, height boundary, and plane). For each cell group, all member cells of the cell group have all attributes of the associated attribute set in common. For example, if an attribute set of a cell group includes line and height attributes, then the UE may assume that all member cells of the cell group are in a same line and are at a same height. The plurality of PRSs transmitted includes a plurality of PRS IDs (e.g., scrambling ID, resource ID). In an aspect, the PRS IDs correspond to the plurality of cells. For each cell group, the PRS ID of each member cell indicates a membership of that cell in the cell group. For example, when scrambling IDs are used, the bit values of the attribute range of the scrambling ID for an attribute is the same for all member cells.

At 1210, the UE receives the attribute and cell group information. In an aspect, means to perform block 1210 may include one or more of the controller/processor 359, the memory 360, the RX processor 356, the transceiver 354, and/or the antenna 352 of the UE 350 illustrated in FIG. 3.

At 1215, the network entity can configure the plurality of cells to transmit a plurality of PRSs. In an aspect, means to perform block 1215 may include one or more of the controller/processor 375 and/or the memory 376 of the base station 310 illustrated in FIG. 3A, e.g., when the base station 310 serves as the location server. In another aspect, means to perform block 1215 may include one or more of the processor 301B, the volatile memory 302B, the non-volatile memory 303B, and/or the drive 306*b* of the server 300B illustrated in FIG. 3B.

At 1220, the UE receives the plurality of PRSs from the plurality of cells. In an aspect, means to perform block 1220 may include one or more of the controller/processor 359, the memory 360, the RX processor 356, the transceiver 354, and/or the antenna 352 of the UE 350 illustrated in FIG. 3.

At 1230, the UE detects a plurality of TOAs of the received plurality of PRSs. For example, for each PRS, the corresponding TOA may be chosen such that it is the earliest local maximum of the CER meeting the threshold requirements (e.g., at least some threshold dB higher than the median of the CER, and no more than some threshold dB lower than the main peak of the CER). In an aspect, means to perform block 1220 may include one or more of the controller/processor 359 and/or the memory 360 of the UE 350 illustrated in FIG. 3.

At 1240, the UE prunes the plurality of TOAs based on the plurality of PRSs. For example, the UE can sort the TOAs based on one or more quality metrics (e.g., estimated SINR or SNR, median/TOA-peak ratio, median/main peak ratio, etc.). Then the sorted TOAs may be pruned. In an aspect, means to perform block 1240 may include one or more of the controller/processor 359 and/or the memory 360 of the UE 350 illustrated in FIG. 3.

At 1250, the TDOA vector may be derived from the pruned TOAs. In an aspect, means to perform block 1250 may include one or more of the controller/processor 359 and/or the memory 360 of the UE 350 illustrated in FIG. 3. The UE sorts the TOAs such that the resulting TDOA vector include TOA related measurements (e.g., TOAs, RSTDs) of multiple cells in which each cell represented in the TDOA vector is a cell of the plurality of cells.

Also, the cells represented in the TDOA vector are sufficient to determine a position of the UE in at least 2D. For example, the TOA pruning may be such that the TDOA vector includes TOA related measurements from at least three cells that are NOT co-sited with each other. In other words, the TDOA should represent at least three cells with different co-site attributes. This ensures that TOAs of PRSs from a sufficient number of geographically dispersed cells are taken into account for 2D position determination. Of course, if the network allows, more than three TOA related measurements may be included. Additional measurements can help to reduce the uncertainties.

If cell groups with different line attributes are included, then in an aspect, positioning accuracy may be enhanced by pruning the TOAs such that the TDOA vector represents multiple—at least two—cells with different line attributes. If cell groups with different area boundary attributes are included, then in an aspect, positioning accuracy may be enhanced by pruning the TOAs such that the TDOA vector represents multiple—at least two—cells with different area boundary attributes.

If the UE position in 3D is desired, then TDOA should include TOA related measurements from at least four geographically dispersed cells. In an embodiment, at least four cells that are not co-sited with each other may be represented in the TDOA vector. In another embodiment, two of the cells may be within a same boundary area, but at different heights. Of course, it is preferable that the cells are in different boundary areas and at different heights. That is, if cell groups with different height attributes are included, then in an aspect, positioning accuracy may be enhanced by pruning the TOAs such that the TDOA vector represents multiple—at least two—cells with different height attributes. Also, if cell groups with different plane attributes are included, then in an aspect, positioning accuracy may be enhanced by pruning the TOAs such that the TDOA vector represents multiple—at least two—cells with different plane attributes. Again, if the network allows, more than four TOA related measurements may be included to reduce the uncertainties.

At 1260, the UE sends the TDOA vector to the network entity, e.g., the location server. In an aspect, means to perform block 1260 may include one or more of the controller/processor 359, the memory 360, the TX processor 368, the transceiver 354, and/or the antenna 352 of the UE 350 illustrated in FIG. 3.

At 1265, the network entity, e.g., the location server, receives the TDOA vector. In an aspect, means to perform block 1265 may include one or more of the controller/processor 375, the memory 376, the RX processor 370, the transceiver 318, and/or the antenna 320 of the base station 310 illustrated in FIG. 3A, e.g., when the base station 310 serves as the location server. In another aspect, means to perform block 1265 may include one or more of the processor 301B, the volatile memory 302B, the non-volatile memory 303B, the drive 306*b*, and/or the network access ports 304B of the server 300B illustrated in FIG. 3B.

At 1275, since the location server is aware of the x, y, z coordinates of the plurality of cells, at 1275, the location server determines or otherwise estimates the UE position based on the TDOA vector. In an aspect, means to perform block 1275 may include one or more of the controller/processor 375, the memory 376, the RX processor 370, the transceiver 318, and/or the antenna 320 of the base station 310 illustrated in FIG. 3A, e.g., when the base station 310 serves as the location server. In another aspect, means to perform block 1275 may include one or more of the processor 301B, the volatile memory 302B, the non-volatile memory 303B, the drive 306*b*, and/or the network access ports 304B of the server 300B illustrated in FIG. 3B.

In an aspect, the memory 376 of the base station 310 in FIG. 3A may be an example of a computer-readable medium that stores computer executable instructions for one or more of the TX processor 316, the controller/processor 375, the channel estimator 374, and/or the RX processor 370 of the base station 310 to perform blocks 1205, 1215, 1265 and 1275 of the method 1200 when the base station 310 serves as the location server. In another aspect, the volatile memory 302B, the nonvolatile memory 303B, and/or the disc drive 304B of the server 300B may be examples of computer-readable medium that stores computer executable instructions for one or more of the processor 301B and/or the network access ports 304B of the server 300B to perform blocks 1205, 1215, 1265 and 1275 of the method 1200.

In yet another aspect, the memory 360 of the UE 350 in FIG. 3A may be an example of a computer-readable medium that stores computer executable instructions for one or more of the TX processor 368, the controller/processor 358, the channel estimator 358, and/or the RX processor 356 of the UE 350 to perform blocks 1210, 1220, 1230, 1240, 1250 and 1260 the method 1200.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of a user equipment (UE), comprising:
receiving a plurality of positioning reference signals (PRS) from a plurality of cells of a network, the plurality of cells being grouped into one or more cell groups, each cell group comprising one or more member cells, each member cell being one of the plurality of cells, each cell group being associated with an attribute set comprising one or more attributes, for each cell group, all member cells having all attributes of the associated attribute set in common, the plurality of PRSs including a plurality of PRS IDs, and for each cell group, a PRS ID of each member cell indicating a membership of that member cell in that cell group;
detecting a plurality of time of arrivals (TOA) of the plurality of PRSs;
deriving a time difference of arrival (TDOA) vector from the plurality of TOAs; and
sending the TDOA vector to a network entity of the network,
wherein the TDOA vector includes multiple TOA related measurements of multiple cells,
wherein the plurality of the cells provide wireless communication services in addition to transmitting PRSs,
wherein at least one cell of the plurality of cells is a member of more than one cell group, wherein the multiple TOA related measurements of the multiple cells included in the TDOA vector are sufficient to determine a position of the UE in three dimensions (3D), and wherein for at least one cell group, at least one attribute of the associated attribute set is one of:
a height attribute indicating that heights of all member cells of the at least one cell group are within a threshold height difference of each other, and
a plane attribute indicating that all member cells of the at least one cell group are on a two dimensional (2D) plane.

2. The method of claim 1,
wherein each cell associated with a TOA measurement in the TDOA vector is a cell of the plurality of cells, and
wherein the multiple TOA related measurements of the multiple cells included in the TDOA vector are sufficient to determine a position of the UE at least in two dimensions (2D).

3. The method of claim 1, wherein for each cell group, all attributes of the associated attribute set are relative attributes.

4. The method of claim 1, further comprising:
pruning the plurality of TOAs based on the plurality of PRSs,
wherein the TDOA vector is derived from the pruned TOAs.

5. The method of claim 4, wherein pruning the plurality of TOAs comprise:
sorting the TOAs based on one or more quality metrics; and
pruning the sorted TOAs.

6. The method of claim 4, wherein at least one cell group, at least one attribute of the associated attribute set is one of:
a co-site attribute indicating that all member cells of the at least one cell group are co-sited,
a line attribute indicating that all member cells of the at least one cell group are in a line, and
an area boundary attribute indicating that all member cells of the at least one cell group are within a threshold area boundary.

7. The method of claim 6, wherein the plurality of TOAs are pruned so that the TDOA vector represents any one or more of:
at least three cells with different co-site attributes,
at least two cells with different line attributes, and
at least two cells with different area boundary attributes.

8. The method of claim 1, wherein the plurality of TOAs are pruned so that the TDOA vector represents one or both of:
at least two cells with different height attributes, and
at least two cells with different plane attributes.

9. The method of claim 1, wherein heights of member cells of one cell group differs from heights of member cells of another cell group by at least a minimum group height difference.

10. The method of claim 1, wherein the plurality of PRS IDs includes a plurality of scrambling IDs, each scrambling ID corresponding to one of the plurality of cells.

11. The method of claim 10,
wherein bits of each scrambling ID are divided into one or more attribute bit ranges, each attribute bit range comprising one or more bits, each attribute bit range being mapped to an attribute type of one or more attribute types,
wherein for each cell, each attribute of that cell is encoded in the attribute bit range of the scrambling ID mapped to the attribute type of that attribute, and
wherein the method further comprises:
receiving a scrambling ID information from the network entity, the scrambling ID information specifying a mapping between the one or more attribute bit ranges and the one or more attribute types.

12. The method of claim 1, wherein the plurality of PRS IDs includes a plurality of resource IDs, each resource ID corresponding to one of the plurality of cells.

13. The method of claim 12,
wherein the plurality of resource IDs are grouped into one or more resource ID groups, each resource ID group corresponding to a cell group of the one or more cell groups, and
wherein the method further comprises one or both of:
retrieving a default resource ID group information configured within the UE, the default resource ID group information identifying the one or more resource ID groups; and
receiving a resource ID group information from the network entity, the resource ID group information identifying the one or more resource ID groups.

14. A method of a network entity of a network, comprising:
configuring a plurality of cells of the network to transmit a plurality of positioning reference signals (PRS) to a user equipment (UE), the plurality of cells being grouped into one or more cell groups, each cell group comprising one or more member cells, each member cell being one of the plurality of cells, each cell group being associated with an attribute set comprising one or more attributes, for each cell group, all member cells having all attributes of the associated attribute set in common, the plurality of PRSs including a plurality of PRS IDs, and for each cell group, a PRS ID of each member cell indicating a membership of that member cell in that cell group;
receiving a time difference of arrival (TDOA) vector from the UE; and
determining a position of the UE based on the TDOA vector,
wherein the TDOA vector includes multiple TOA related measurements of multiple cells,
wherein each cell associated with a TOA measurement in the TDOA vector is a cell of the plurality of cells,
wherein the multiple TOA related measurements of the multiple cells included in the TDOA vector are sufficient to determine a position of the UE at least in two dimensions (2D),
wherein the plurality of the cells provide wireless communication services in addition to transmitting PRSs,
wherein at least one cell of the plurality of cells is a member of more than one cell group,
wherein the multiple TOA related measurements of the multiple cells included in the TDOA vector are sufficient to determine the position of the UE in three dimensions (3D), and
wherein for at least one cell group, at least one attribute of the associated attribute set is one of:
a height attribute indicating that heights of all member cells of the at least one cell group are within a threshold height difference of each other, and
a plane attribute indicating that all member cells of the at least one cell group are on a two dimensional (2D) plane.

15. The method of claim 14, wherein for each cell group, all attributes of the associated attribute set are relative attributes.

16. The method of claim 14, wherein at least one cell group, at least one attribute of the associated attribute set is one of:
a co-site attribute indicating that all member cells of the at least one cell group are co-sited,
a line attribute indicating that all member cells of the at least one cell group are in a line, and
an area boundary attribute indicating that all member cells of the at least one cell group are within a threshold area boundary.

17. The method of claim 14, wherein heights of member cells of one cell group differs from heights of member cells of another cell group by at least a minimum group height difference.

18. The method of claim 14, wherein the plurality of PRS IDs includes a plurality of scrambling IDs, each scrambling ID corresponding to one of the plurality of cells.

19. The method of claim 18,
wherein bits of each scrambling ID are divided into one or more attribute bit ranges, each attribute bit range comprising one or more bits, each attribute bit range being mapped to an attribute type of one or more attribute types,
wherein for each cell, each attribute of that cell is encoded in the attribute bit range of the scrambling ID mapped to the attribute type of that attribute, and
wherein the method further comprises:
sending a scrambling ID information to the UE, the scrambling ID information specifying a mapping between the one or more attribute bit ranges and the one or more attribute types.

20. The method of claim 14, wherein the plurality of PRS IDs includes a plurality of resource IDs, each resource ID corresponding to one of the plurality of cells.

21. The method of claim 20,
wherein the plurality of resource IDs are grouped into one or more resource ID groups, each resource ID group corresponding to a cell group of the one or more cell groups, and
wherein the method further comprises:
transmitting a resource ID group information to the UE, the resource ID group information identifying the one or more resource ID groups.

22. The method of claim 20, wherein the plurality of resource IDs are ordered such that between any pair of a first cell group and a second cell group, resource IDs of all member cells of the first cell group are less than resource IDs of all member cells of the second cell group.

23. A user equipment (UE), comprising:
a memory;
a transceiver; and
a processor coupled to the memory and the transceiver,
wherein the processor, the memory, and the transceiver are configured to:
receive a plurality of positioning reference signals (PRS) from a plurality of cells of a network, the plurality of cells being grouped into one or more cell groups, each cell group comprising one or more member cells, each member cell being one of the plurality of cells, each cell group being associated with an attribute set comprising one or more attributes, for each cell group, all member cells having all attributes of the associated attribute set in common, the plurality of PRSs including a plurality of PRS IDs, and for each cell group, a PRS ID of each member cell indicating a membership of that member cell in that cell group;
detect a plurality of time of arrivals (TOA) of the plurality of PRSs;
derive a time difference of arrival (TDOA) vector from the plurality of TOAs; and
send the TDOA vector to a network entity of the network,
wherein the TDOA vector includes multiple TOA related measurements of multiple cells,
wherein the plurality of the cells provide wireless communication services in addition to transmitting PRSs,
wherein at least one cell of the plurality of cells is a member of more than one cell group,
wherein the multiple TOA related measurements of the multiple cells included in the TDOA vector are sufficient to determine a position of the UE in three dimensions (3D), and
wherein for at least one cell group, at least one attribute of the associated attribute set is one of:
a height attribute indicating that heights of all member cells of the at least one cell group are within a threshold height difference of each other, and
a plane attribute indicating that all member cells of the at least one cell group are on a two dimensional (2D) plane.

24. The UE of claim 23,
wherein the processor, the memory, and the transceiver are further configured to prune the plurality of TOAs based on the plurality of PRSs, and
wherein the TDOA vector is derived from the pruned TOAs.

25. The UE of claim 24,
wherein at least one cell group, at least one attribute of the associated attribute set is one of:
a co-site attribute indicating that all member cells of the at least one cell group are co-sited,
a line attribute indicating that all member cells of the at least one cell group are in a line, and
an area boundary attribute indicating that all member cells of the at least one cell group are within a threshold area boundary, and
wherein the processor, the memory, and the transceiver are further configured to prune the plurality of TOAs so that the TDOA vector represents any one or more of:
at least three cells with different co-site attributes,
at least two cells with different line attributes, and
at least two cells with different area boundary attributes.

26. A network entity of a network, comprising:
a memory;
a transceiver; and
a processor coupled to the memory and the transceiver,
wherein the processor, the memory, and the transceiver are configured to:
configure a plurality of cells of the network to transmit a plurality of positioning reference signals (PRS) to a user equipment (UE), the plurality of cells being grouped into one or more cell groups, each cell group comprising one or more member cells, each member cell being one of the plurality of cells, each cell group being associated with an attribute set comprising one or more attributes, for each cell group, all member cells having all attributes of the associated attribute set in common, the plurality of PRSs including a plurality of PRS IDs, and for each cell group, a PRS ID of each member cell indicating a membership of that member cell in that cell group;

receive a time difference of arrival (TDOA) vector from the UE; and determine a position of the UE based on the TDOA vector, wherein the TDOA vector includes multiple TOA related measurements of multiple cells, wherein each cell associated with a TOA measurement in the TDOA vector is a cell of the plurality of cells, wherein the multiple TOA related measurements of the multiple cells included in the TDOA vector are sufficient to determine a position of the UE at least in two dimensions (2D), wherein the plurality of the cells provide wireless communication services in addition to transmitting PRSs, wherein at least one cell of the plurality of cells is a member of more than one cell group, wherein the multiple TOA related measurements of the multiple cells included in the TDOA vector are sufficient to determine the position of the UE in three dimensions (3D), and wherein for at least one cell group, at least one attribute of the associated attribute set is one of:

a height attribute indicating that heights of all member cells of the at least one cell group are within a threshold height difference of each other, and a plane attribute indicating that all member cells of the at least one cell group are on a two dimensional (2D) plane.

27. The network entity of claim 26, wherein at least one cell group, at least one attribute of the associated attribute set is one of:

a co-site attribute indicating that all member cells of the at least one cell group are co-sited, a line attribute indicating that all member cells of the at least one cell group are in a line, and an area boundary attribute indicating that all member cells of the at least one cell group are within a threshold area boundary.

* * * * *